US011500798B2

(12) United States Patent
Wu et al.

(10) Patent No.: US 11,500,798 B2
(45) Date of Patent: Nov. 15, 2022

(54) DATA TRANSMISSION DEVICE, DATA TRANSMISSION METHOD AND NON-TRANSITORY COMPUTER READABLE MEDIUM

(71) Applicant: ASUSTeK COMPUTER INC., Taipei (TW)

(72) Inventors: I-Heng Wu, Taipei (TW); Chang-Hsien Wang, Taipei (TW); Yang-Jui Chang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 367 days.

(21) Appl. No.: 16/736,939

(22) Filed: Jan. 8, 2020

(65) Prior Publication Data
US 2020/0272586 A1 Aug. 27, 2020

(30) Foreign Application Priority Data

Feb. 26, 2019 (TW) .................................. 108106569

(51) Int. Cl.
*G06F 9/44* (2018.01)
*G06F 13/20* (2006.01)
*G06F 8/77* (2018.01)

(52) U.S. Cl.
CPC ................ *G06F 13/20* (2013.01); *G06F 8/77* (2013.01)

(58) Field of Classification Search
None
See application file for complete search history.

(56) References Cited

U.S. PATENT DOCUMENTS 9,152,694 B1 * 10/2015 Padidar ................. G06F 16/285
2015/0244820 A1 * 8/2015 Verkasalo ............. G06F 16/958
707/740
2016/0255139 A1 * 9/2016 Rathod ............... G06F 16/9535
709/203

FOREIGN PATENT DOCUMENTS

CN 107018046 A 8/2017
CN 107343091 A 11/2017

* cited by examiner

*Primary Examiner* — Qamrun Nahar
(74) *Attorney, Agent, or Firm* — McClure, Qualey & Rodack, LLP

(57) ABSTRACT

The disclosure provides a data transmission device. The data transmission device includes a storage medium, a processor and a communication interface. The storage medium is configured to store a plurality of applications. The processor is coupled to the storage media and configured to determine a host application among the plurality of applications, where the host application includes a software development kit (SDK) program, and executes the SDK program of the host application to request behavior data of the plurality of applications. The communication interface is coupled to the processor and is configured to transmit the behavior data to a server.

15 Claims, 6 Drawing Sheets

DATA TRANSMISSION DEVICE, DATA TRANSMISSION METHOD AND NON-TRANSITORY COMPUTER READABLE MEDIUM

CROSS-REFERENCE TO RELATED APPLICATION

This application claims the priority benefit of Taiwan Application Serial No. 108106569, filed on Feb. 26, 2019. The entirety of the above-mentioned patent application is hereby incorporated by reference herein and made a part of specification.

BACKGROUND OF THE INVENTION

Field of the Invention

The disclosure relates to an electronic device and a data processing method, and particularly to a data transmission device and a data transmission method.

Description of the Related Art

With the rise of applications of big data, companies are actively looking for tools that can effectively collect data for analysis of target data. By the analysis of target data, the companies can explore the life style or usage habits of users, and develop new business models.

However, there are many limitations to collect information of applications through mobile device. For example, data within certain file formats cannot be transmitted, network traffic of uploading data is restricted, sending requests is limited, etc. Therefore, it is difficult to collect data effectively.

BRIEF SUMMARY OF THE INVENTION

According to an embodiment of the disclosure, a data transmission device is disclosed. The data transmission device includes a storage medium, a processor and a communication interface. The storage medium is configured to store a plurality of applications. The processor is coupled to the storage medium, and the processor is configured to determine a host application among the plurality of applications, where the host application includes a software development kit (SDK) program. The processor is configured to execute the SDK program of the host application to request behavior data from the plurality of applications. The communication interface is coupled to the processor. The communication interface is configured to transmit the behavior data to a server.

According to another embodiment, a data transmission method applicable to a data transmission device is disclosed, where the data transmission device includes a storage module storing a plurality of applications, a processor coupled to the storage module and a communication interface coupled to the processor. The data transmission method includes the following steps: determining, by the processor, a host application among the plurality of applications, where the host application includes an SDK program; executing the SDK program of the host application to request behavior data from the plurality of applications; and transmitting, by the host application, the behavior data to a server through the communication interface.

According to another embodiment, a non-transitory computer readable recording medium storing a plurality of program codes is disclosed, where after the program codes are loaded into a processor, the processor executes the program codes to complete the following steps: determining a host application among a plurality of applications, where the host application includes an SDK program; executing the SDK program of the host application to request behavior data from the plurality of applications; and transmitting, by the host application, the behavior data to a server.

BRIEF DESCRIPTION OF THE DRAWINGS

Reading the following descriptions with reference to the accompanying drawings helps understand aspects of this disclosure better. It should be noted that according to description requirements, features in the accompanying drawings may not be drawn to scale. In fact, for clear description, sizes of the features may be increased or decreased arbitrarily.

DETAILED DESCRIPTION OF THE EMBODIMENTS

Figure 1A:
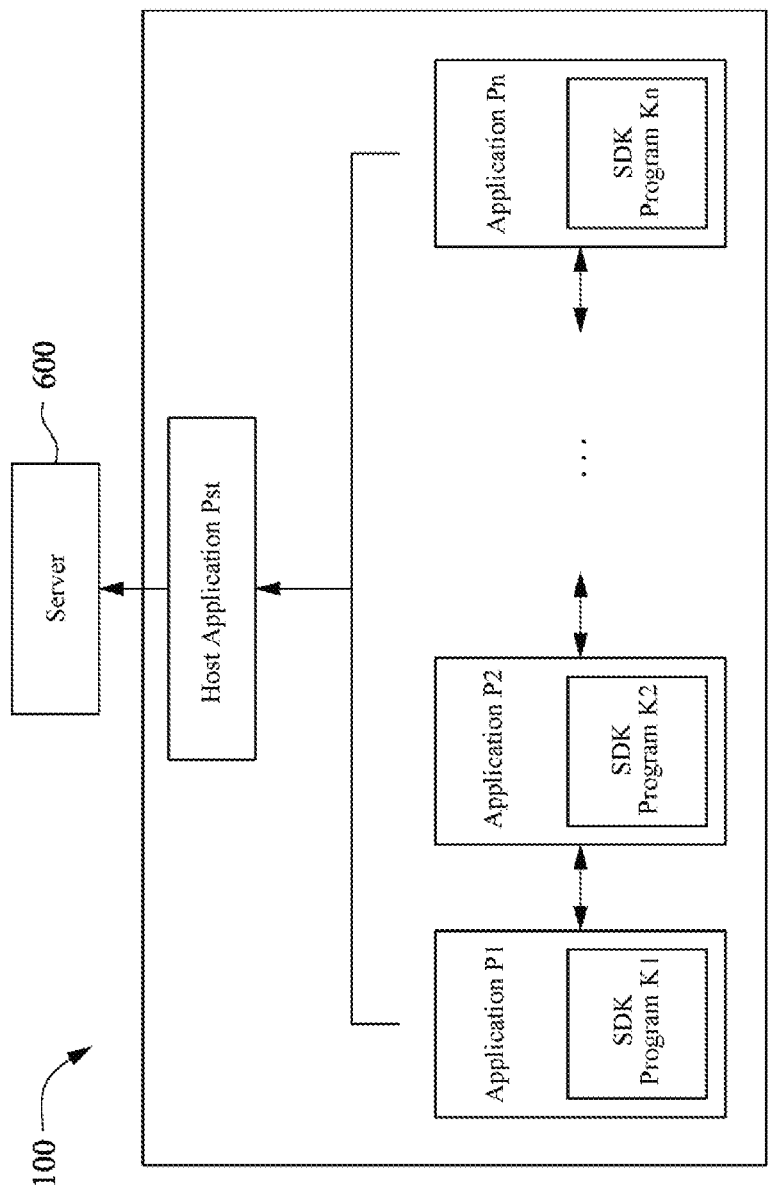
FIG. 1A is a schematic diagram showing data transmission of applications in a distributed architecture in some embodiments of the disclosure.

The following disclosure provides numerous different embodiments or examples, to implement different features of the invention. Particular examples of elements and arrangements are described below to simplify the invention. Definitely, these examples are merely exemplary and are not intended to limit the invention. For example, forming a first feature on or above a second feature includes not only embodiments in which the first feature is in direct contact with the second feature, but also embodiments in which there is another feature formed between the first feature and the second feature and the first feature may not be in direct contact with the second feature. Further, in the invention, reference numerals or letters may be repeated in different examples. The purpose of repetition is to simplify and clarify the description, rather than to define the relationship between different embodiments and/or configurations discussed.

A data collection architecture for applications on an electronic device, such as, a mobile electronic device or an electronic device having computing capability, is a master-slave data collection architecture. In the master-slave data collection architecture, a resident service responsible for data collection (such as Google Mobile Service (GMS)) needs to be launched in the electronic device. Each application transmits data that collected from a user to the resident service includes event and type, and the resident service uniformly transmits the data to a server. However, the data collection of this master-slave data collection architecture has limited effect. In an embodiment, when the resident service is removed, data sharing is not available between the applications. In addition, the resident service needs to be remained in the background of an operating system, resulting in power consumption of the electronic device. Accordingly, the disclosure provides a distributed architecture that the applications load a software development kit (SDK), and the applications share data and transmit data in turn to the server responsible for data analysis. The details are as follows.

Please refer to FIG. 1A, which is a schematic diagram showing data transmission of applications in a distributed architecture in some embodiments of the disclosure. As shown in FIG. 1A, a plurality of applications P1-Pn are installed on a data transmission device 100. The applications P1-Pn can be any programs executable in the operating system of the data transmission device 100. Besides, the applications P1-Pn also collect behavior data of the data transmission device 100 or behavior data of an application to be analyzed. In an embodiment, the behavior data of the data transmission device 100 or the application is, but not limited to, a hyperlink of a webpage clicked by a user during the operation, duration for a webpage and number of views, clicked advertisements, internet address of the data transmission device 100, version of an operating system, a device model, etc.

In some embodiments, the data transmission device 100 is an electronic device such as a portable electronic device, a mobile phone, a tablet computer, a personal digital assistant (PDA), a wearable device, or a notebook computer, which is not limited herein.

In this embodiment, the data transmission device 100 further includes software development kit (SDK) programs, and the applications P1-Pn load the SDKs such that the applications P1-Pn respectively include the SDK programs K1-Kn. In this way, the applications P1-Pn implement distributed data collection and data transmission through the operation of the SDK programs K1-Kn. In an embodiment, the data transmission device 100 selects an application from the applications P1-Pn, in an embodiment, the application P1 is selected. And the application P1 is set as a host application Pst, thus the SDK program of the host application Pst (in this embodiment, the SDK program of the host application Pst is the SDK program K1) collects the behavior data of all the applications P1-Pn. The data transmission device 100 determines whether to transmit all the data collected by the host application Pst to the server 600 by using conditional determination and inspection rules. The conditional determination and inspection rules will be described later.

Figure 1B:
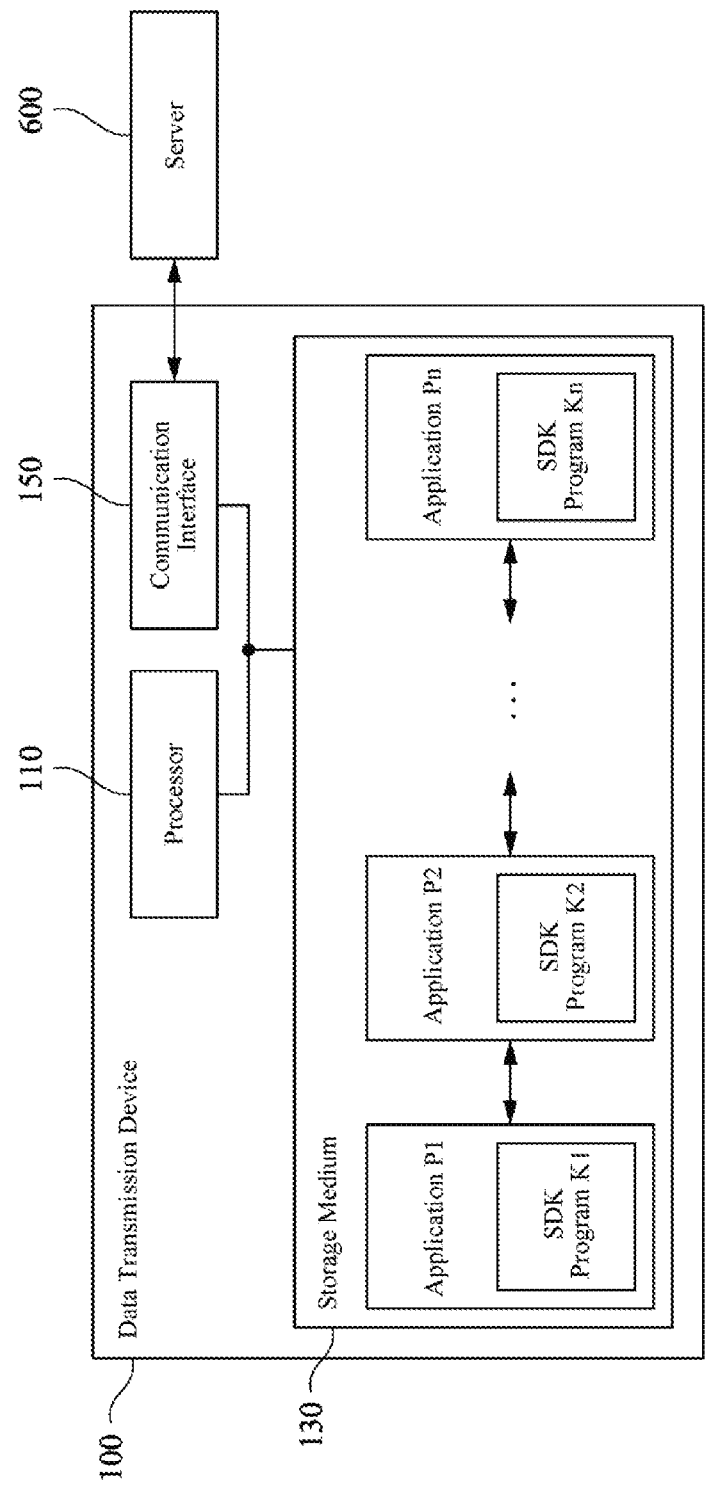
FIG. 1B is a function block schematic diagram of a data transmission device in some embodiments of the disclosure.

Please refer to FIG. 1B, which is a function block schematic diagram of a data transmission device 100 in some embodiments of the disclosure. As shown in FIG. 1B, the data transmission device 100 includes a processor 110 and a storage medium 130. The processor 110 is coupled to the storage medium 130. The storage medium 130 stores a plurality of applications P1-Pn and SDK programs K1-Kn, and the processor 110 reads the applications P1-Pn and the SDK programs K1-Kn to execute related program functions, such as executing program instructions of the applications P1-Pn, and collecting related behavior data. The data transmission device 100 further includes a communication interface 150. The communication interface 150 is coupled to the processor 110. The communication interface 150 is configured to transmit the behavior data to a server 600.

In an embodiment, the processor 110 is a central processing unit (CPU), a system on chip (SoC), an application processor, an audio processor, a digital signal processor (DSP), or a processing chip or a controller having a specific function, which is not limited herein.

In an embodiment, the storage medium 130 is a random access memory (RAM) or a non-volatile memory (such as a flash memory, a read only memory (ROM)), a hard disk drive (HDD), a solid state drive (SSD) or an optical memory, which is not limited herein.

In an embodiment, the communication interface 150 is a communication interface, a chip or the like that supports Global System for Mobile communication (GSM), Long Term Evolution (LTE), 5th generation mobile networks, Worldwide interoperability for Microwave Access (WiMAX), Wireless Fidelity (Wi-Fi), IEEE 802.11 communication standard technology, Bluetooth technology or wired network, which is not limited herein.

Figure 2:
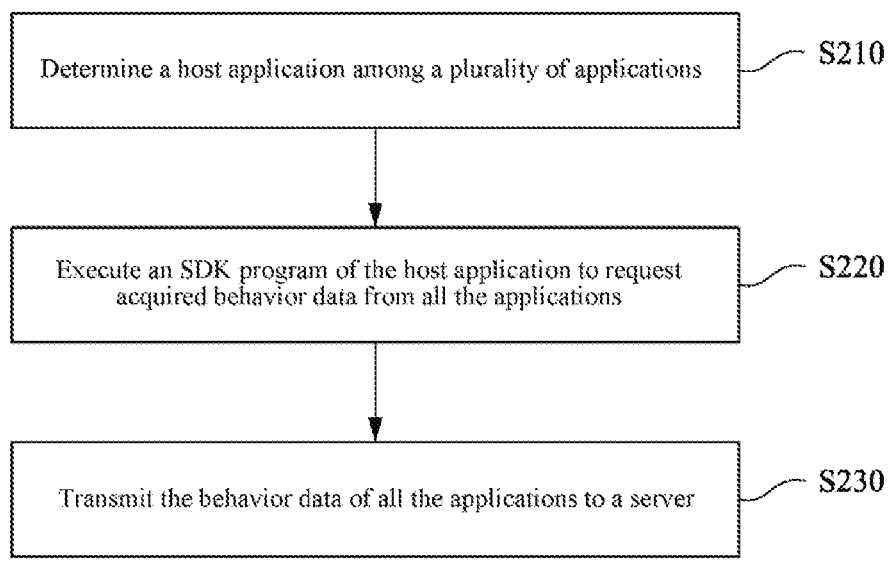
FIG. 2 is a flow chart showing the steps of a data transmission method executed by the data transmission device in some embodiments of the disclosure.

Please refer to FIG. 2, which is a flow chart showing the steps of a data transmission method executed by the data transmission device 100 in some embodiments of the disclosure. For the description of the following data transmission method, please refer to FIG. 1A and FIG. 1B together.

First, step S210 is executed. The processor 110 determines an application among the plurality of applications P1-Pn as the host application Pst, and the host application Pst includes the corresponding SDK program. In an embodiment, the application P1 is selected as the host application Pst, the SDK program corresponding to the host application Pst is the SDK program K1 of the application P1. In an embodiment, the method of determining (or selecting) an application from the applications P1-Pn as the host application by the data transmission device 100 is a round robin (RR) scheduling algorithm, a priority scheduling algorithm, a first-come first-served (FCFS) scheduling algorithm, a multilevel queue scheduling algorithm or other similar scheduling algorithms. In an embodiment, the processor 110 selects an application as the host application Pst among the applications P1-Pn at time intervals.

Next, step S220 is executed. The processor 110 executes the SDK program of the host application Pst to request the behavior data from all the applications P1-Pn. And, in step S230, the communication interface 150 of the data transmission device 100 transmits the collected behavior data to the server 600. The processor 110 executes the SDK program of the host application Pst, so that the host application Pst obtains the behavior data of the operation of the device or the application to be analyzed when each of the applications P1-Pn is executed in a foreground or a background of their own.

Accordingly, the data transmission device 100 is provided with a plurality of applications P1-Pn and SDK programs K1-Kn, where each application has an SDK program corresponding to and executed in the application (in an embodiment, the function of the SDK program K1 is executed via the operation on the application P1), and thus, the data transmission device 100 executes the SDK programs K1-Kn such that each of all the applications P1-Pn obtain the behavior data of other applications P1-Pn. The host application Pst uploads the collected behavior data to the server 600. In one embodiment, an architecture of the plurality of applications P1-Pn on the data transmission device 100 is a distributed data transmission architecture, and an application is selected from the applications P1-Pn of the data transmission device 100 to implement transmission of the behavior data.

Figure 3A:
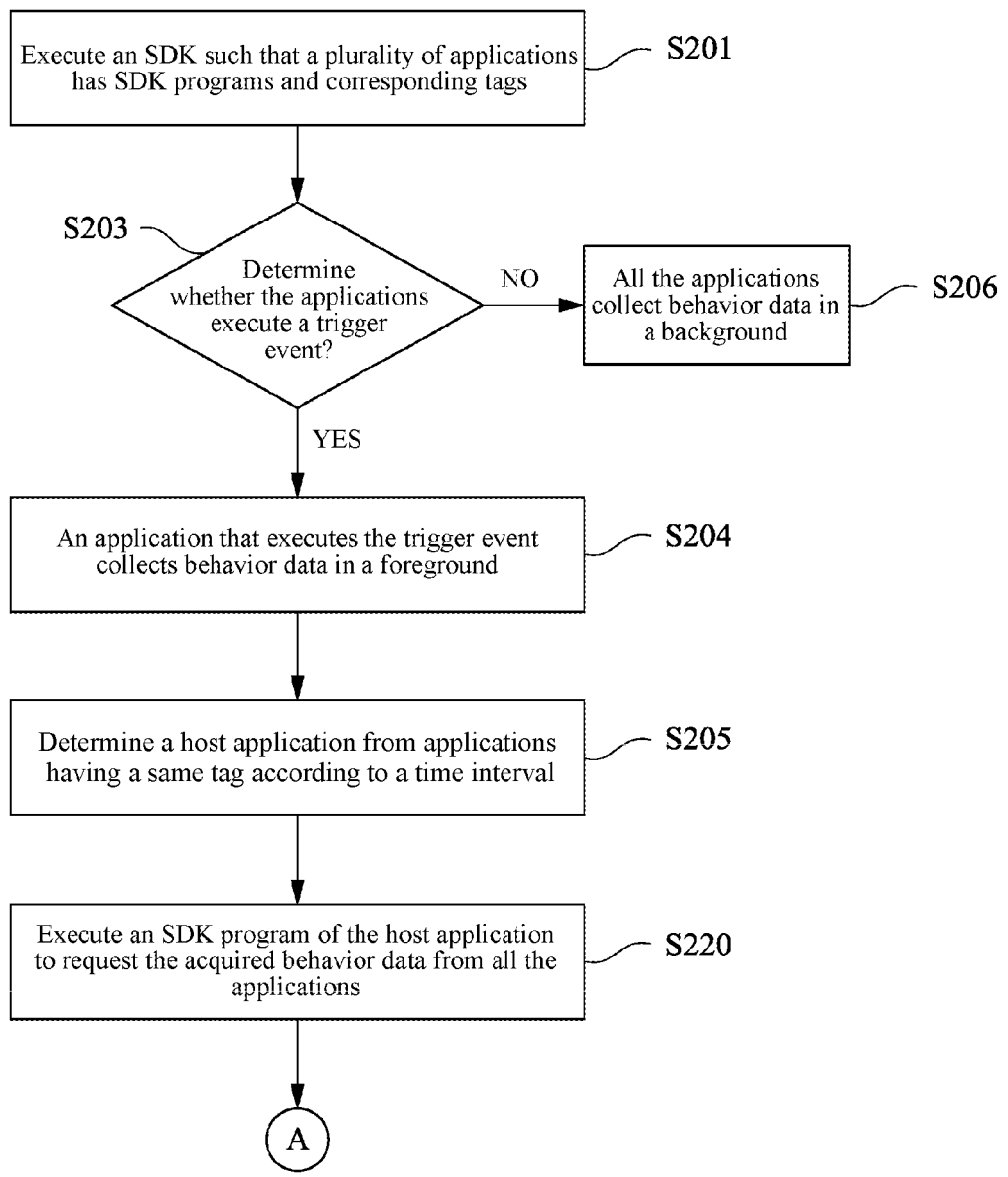
FIG. 3A is a flow chart showing the steps of executing data collection in the foreground and background by a plurality of applications according to the data transmission method executed by the data transmission device in some embodiments of the disclosure.

Please refer to FIG. 3A, which is a flow chart showing the steps of executing data collection in the foreground and background by a plurality of applications by the data transmission device 100 in some embodiments of the disclosure. Please refer to FIG. 1A and FIG. 1B below, in conjunction with the description of FIG. 3A. As shown in FIG. 3A, in step S201, the processor 110 executes a software development kit (SDK) such that the plurality of applications P1-Pn has the SDK programs K1-Kn and corresponding tags. In an embodiment, applications P1-P10 having a first tag are classified into a first group, applications P11-P20 having a second tag are classified into a second group, and the rest can be done in the same manner. Applications belonging to the same group have the same tag, so the applications P1-Pn are classified into multiple different groups. The processor 110 reads the applications having the same tag to determine which applications are the same group for distributed data transmission. In an embodiment, the applications P1-P10 have the same tag, and the processor 110 determines to select the application P1 from the applications P1-P10 as the host application Pst. The applications P11-P20 have the same tag, and the processor 110 determines to select the application P11 from the applications P11-P20 as the host application Pst. The disclosure does not limit the number of applications described above with respect to grouping.

In step S203, the processor 110 determines whether the applications P1-Pn execute a trigger event. In one embodiment, the trigger event is an advertisement that the user clicks on a specific webpage through the operation of an application, initiating a subsequent data transmission method at time intervals (in an embodiment, every two hours), or the like. If the trigger event is executed, the application switches to foreground execution in response to the execution of the trigger event, and then in step S204, the application that executes the trigger event collects the behavior data obtained by itself (for example, the user operates the application P3 to click a webpage advertisement, and collects the clicking of the webpage advertisement or other related behavior data). In an embodiment, the application that executes the trigger event collects the behavior data in the foreground. In another embodiment, the application that executes the trigger event collects the behavior data in the background.

In step S205, the processor 110 selects an application from the applications having the same tag as the host application Ps according to a time interval. In an embodiment, the application P3 executes the trigger event, but after a selection mechanism (such as the aforementioned round robin mechanism), the application P1 is determined to be the host application Pst this time. In other embodiments, after the selection mechanism, the application P3 is selected as the host application Pst. Next, in step S220, the processor 110 executes the SDK program of the host application Pst to request the acquired behavior data from each application having the same tag, followed by step A. If the determination in step S203 is NO, no application that executes the trigger event is detected, then step S206 is executed, and all the applications P1-Pn collect the behavior data in the background.

It is worth mentioning that in FIG. 3A, the application that executes the trigger event is the same as or different from the host application Pst. In an embodiment, the application P3 executes the trigger event, and the processor 110 still determines, by using a predetermined scheduling method, an application other than the application P3 (such as the application P1 or the application P2) as the host application Pst. Accordingly, the data transmission device 100 provides an application group for distributed data collection, and distributes a data collection task to all the applications P1-Pn, or the plurality of applications of the same group.

Figure 3B:
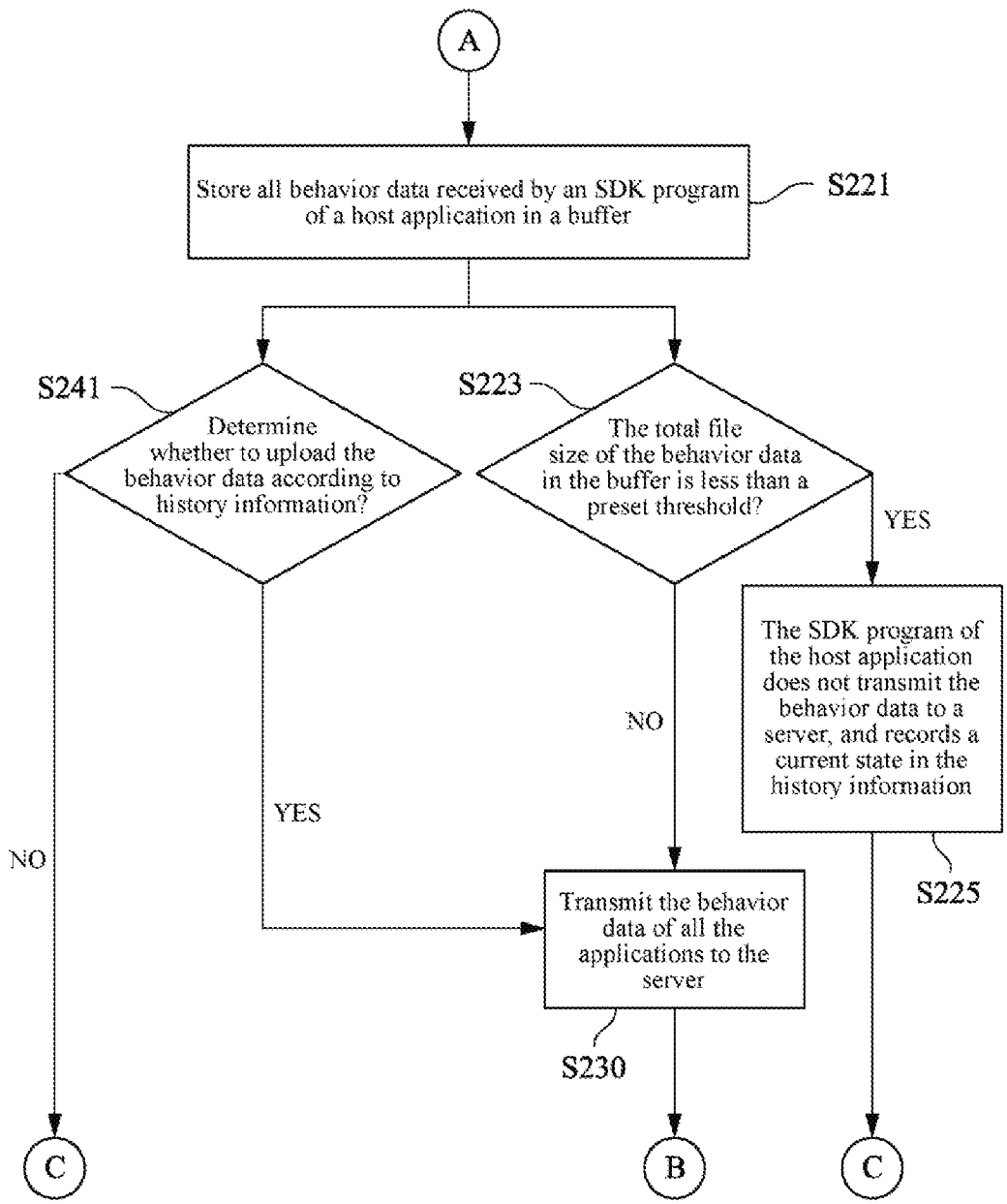
FIG. 3B is a flow chart showing the steps of determining whether to upload behavior data to a server according to the data transmission method executed by the data transmission device in some embodiments of the disclosure.

Please refer to FIG. 3B, which is a flow chart showing the steps of determining whether to upload the behavior data to the server 600 according to the data transmission method executed by the data transmission device 100 in some embodiments of the disclosure. Please refer to FIG. 1A and FIG. 1B below, in conjunction with the description of FIG. 3B.

In an embodiment, after the host application Pst obtains the behavior data of the applications P1-Pn, the behavior data is not transmitted to the server 600 every time. The mechanism for determining whether to upload the behavior data is illustrated as follows. As shown in FIG. 3B, step S221 is executed. The processor 110 stores all the behavior data received by the SDK program of the host application Pst in a buffer of the storage medium 130. The buffer is a buffer storage medium. Next, in step S223, the processor 110 determines whether the total file size of the behavior data stored in the buffer is less than a preset threshold. Alternatively, in step S241, the processor 110 determines whether to upload the behavior data according to history information. The disclosure does not limit the sequence of the two steps. The processor 110 is able to execute one of step S223 and step S241, and if the result of executing step S223 is NO, the execution of step S241 is determined, or if the result of executing step S241 is YES, the execution of step S223 is determined.

In step S223, if the total file size of the behavior data in the buffer is less than the preset threshold, step S225 is executed, the SDK program of the host application Pst does not transmit the behavior data to the server 600, and records the current state in the history information, followed by step C. The history information is at least one of the host application Pst responsible for transmitting the behavior data, time information transmitted, or number of transmissions. In step S223, if the total file size of the behavior data in the buffer is equal to or close to a preset threshold, such as 256 KB, or close to a multiple of a certain unit size, such as n times of 64 KB, step S230 is executed, and the host application Pst transmits all the collected behavior data to the server 600, followed by step B.

Figure 3C:
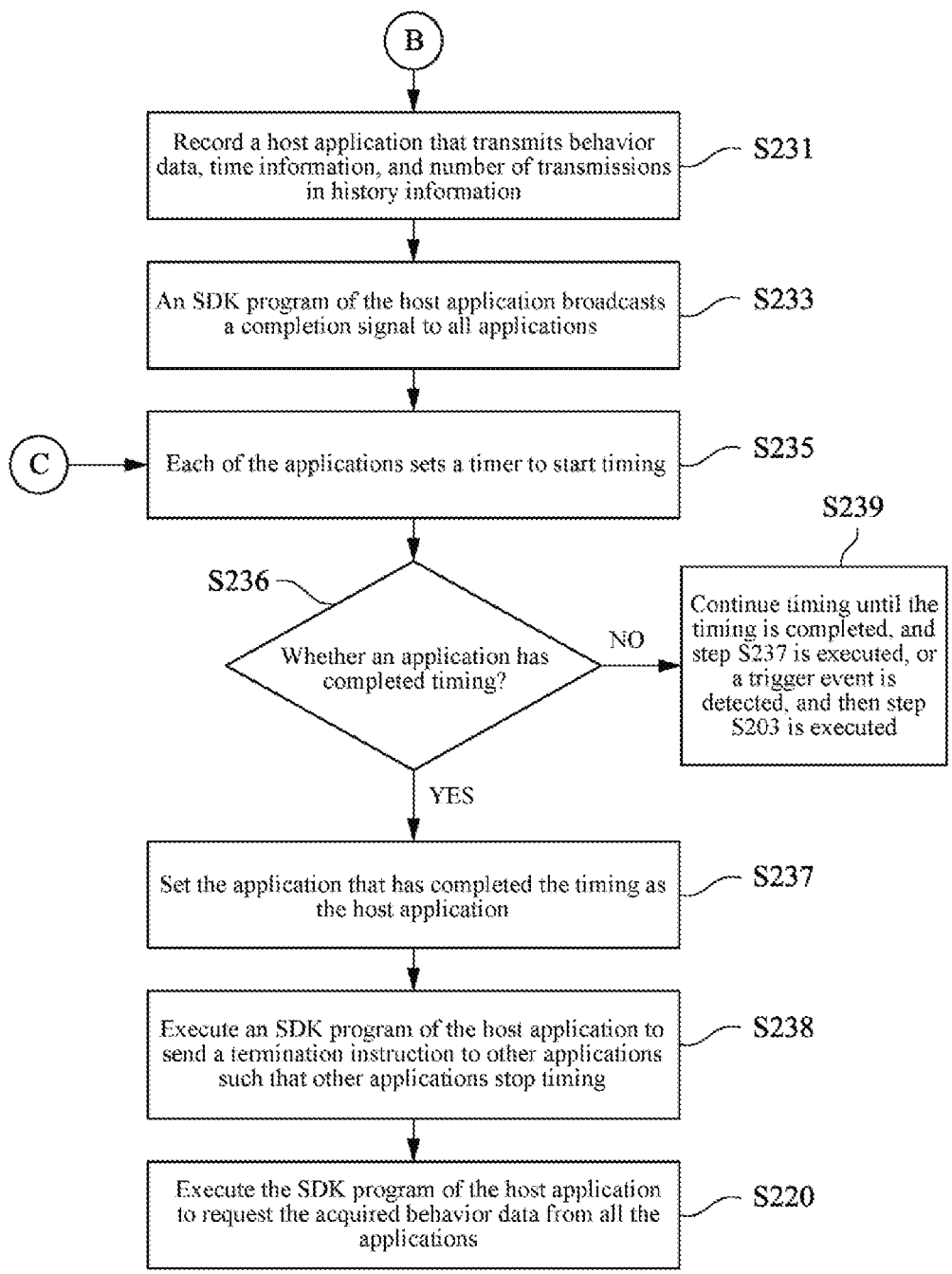
FIG. 3C is a flow chart showing the steps of assisting data collection in the background by the applications according to the data transmission method executed by the data transmission device in some embodiments of the disclosure.

Please refer to FIG. 3C, which is a flow chart showing the steps of assisting data collection in the background by the applications P1-Pn according to the data transmission method executed by the data transmission device 100 in some embodiments of the disclosure. Please refer to FIG. 1A and FIG. 1B below, in conjunction with the description of FIG. 3C.

After the behavior data of all the applications P1-Pn is transmitted to the server 600, then, in step S231, the processor 110 records the host application Pst that transmits the behavior data, the time information, and the number of transmissions in the history information.

Next, in step S233, the processor 110 executes the SDK program of the host application Pst to broadcast a completion signal to all the applications P1-Pn. Therefore, the applications P1-Pn delete the transmitted behavior data that has been transmitted according to the completion signal.

Next, in step S235, each of the applications P1-Pn sets a timer to count down. In an embodiment, a timer value of each the applications P1-Pn is a random value. In another embodiment, the timer value of each the applications P1-Pn is a preset value.

In step S236, wait for the countdown of at least one application to determine whether an application has completed the countdown. In this step, if an application has completed the countdown, step S237 is executed, and the processor 110 sets the application that has completed the countdown as the host application Pst.

In step S238, the processor 110 executes the SDK program of the host application Pst to send a countdown termination instruction to other applications, so that other applications stop their respective timers. In an embodiment, if the application P1 has a countdown time of 30 minutes, the application P2 has a countdown time of 10 minutes and the application P3 has a countdown time of 20 minutes, then the application P2 completes the countdown in the fastest way. Therefore, after completing the countdown, the application P2 sends a countdown termination instruction to the application P1 and the application P3, the application P1 and the application P3 terminate their own timers, and the processor 110 sets the application P2 as the host application Pst responsible for collecting and transmitting the behavior data.

Next, step S220 is executed. The processor 110 executes the SDK program of the host application Pst to request the acquired behavior data from the applications P1-Pn, followed by step A as shown in FIG. 3B.

In step S239, if no application completes the countdown, step S236 is executed, and each of the applications P1-Pn continues counting down until the countdown is completed, and step S237 is executed, or the trigger event aforementioned in FIG. 3A is detected, and then step S203 is executed.

In step S220 shown in FIG. 3C, after each of the applications P1-Pn transmits the acquired behavior data to the host application Pst, referring to FIG. 3B again, all the behavior data is stored in the buffer (step S221).

Next, in step S241, the processor 110 determines, according to the history information, whether to upload the behavior data through the host application Pst determined this time. The history information includes the host application Pst for recording the transmitted behavior data each time, the time information transmitted, and the number of transmissions.

In an embodiment, if the host application Pst (such as the application P3) has uploaded behavior data on the same day, the application P3 is no longer used to upload, and the host application Pst only stores the behavior data. In an embodiment, if the host application Pst (such as the application P3) has uploaded for a preset number of times (such as 10 times), the application P3 is no longer used to upload, but only store the behavior data. In an embodiment, if the host application Pst (such as the application P2) fails to upload in the last uploading, the behavior data is uploaded through the application P2 this time. When determined in step S241 that the host application Pst uploads the behavior data, step S230 is executed; otherwise, step C as shown in FIG. 3B and FIG. 3C is executed.

In some embodiments, a non-transitory computer readable recording medium is provided to store a plurality of program codes. After the program code is loaded into the processor 110 as shown in FIG. 1B, the processor 110 executes the program code and executes the steps as shown in FIG. 2 and FIG. 3A to FIG. 3C. In an embodiment, the processor 110 determines the host application Pst among the plurality of applications P1-Pn, the host application Pst having an SDK program, and executes the SDK program of the host application Pst to request behavior data from the plurality of applications P1-Pn and transmit the behavior data to the server 600.

In summary, behavior data collected by a general application is transmitted to a corresponding service program, and then each service program concentrates the data to a central service program, and the central service program perform unifies uploading, but this central service program can cause power consumption problems because it needs to be resident in an operating system. The data transmission device 100 and the data transmission method of the disclosure provide a distributed application data collection and uploading mechanism, and an application is randomly or alternately selected from the applications P1-Pn as the host application Pst to avoid the need for a specific service program to be resident in the operating system.

In addition, the distributed mechanism can prevent the applications P1-Pn from being deleted during the execution in the background due to the insufficient storage medium, causing the behavior data to be deleted without being uploaded. In the disclosure, the applications P1-Pn can periodically determine a host application Pst during background execution, and the host application Pst collects behavior data of other applications, that is, the applications P1-Pn can assist the transmission of the behavior data with each other in the background, so as to increase the probability that the behavior data is transmitted to the server 600.

The features of the several embodiments are described above, so that a person skilled in the art can better understand the aspects of the invention. A person skilled in the art should understand that the invention may be easily used as a basis for designing or modifying other processes or structures, so as to achieve the same objective and/or same advantage of the embodiments described in this specification. A person of ordinary skill in the art should also understand that, these equivalent structures do not depart from the spirit and scope of the invention, and various changes, replacement, and amendments can be made without departing from the spirit and scope of the invention.

What is claimed is:

1. A data transmission device, comprising:
 a storage medium, configured to store a plurality of applications;
 a processor, coupled to the storage medium and configured to determine a host application among the plurality of applications,
 wherein the host application comprises a software development kit (SDK) program, wherein the processor is configured to execute the SDK program of the host application to request behavior data from the plurality of applications, wherein the plurality of applications share data with each other; and
 a communication interface, coupled to the processor and configured to transmit the behavior data to a server.

2. The data transmission device according to claim 1, wherein each application comprises a tag, and the host application obtains the behavior data of the plurality of applications having the same tag.

3. The data transmission device according to claim 1, wherein the processor is further configured to:
 determine the host application among the plurality of applications according to a time interval;
 request the behavior data from other applications by the SDK program of the host application; and
 record, after transmitting the behavior data to the server, history information, wherein the history information comprises the host application for transmitting the behavior data, time information, and the number of transmissions.

4. The data transmission device according to claim 3, wherein after the SDK program of the host application transmits the behavior data to the server, the processor is further configured to:
execute the SDK program of the host application to broadcast a completion signal to the plurality of applications;
delete, by the plurality of applications, the behavior data that has been transmitted to the host application according to the completion signal; and
set, by each of the SDK programs of the plurality of applications, a timer to start counting down.

5. The data transmission device according to claim 4, wherein the processor is further configured to:
set the application that has completed countdown as the host application;
send a termination instruction to other applications by the SDK program of the host application;
stop, by the SDK program of the plurality of applications, their own timers according to the termination instruction; and
request the behavior data from other applications by the SDK program of the host application.

6. The data transmission device according to claim 4, wherein the processor is further configured to:
request, after the countdown is completed, the behavior data from the plurality of applications, store the behavior data in a buffer, and update the history information by the SDK program of the host application; and
determine whether to upload the behavior data according to the history information,
wherein when determining to upload the behavior data, the SDK program of the host application is executed to transmit the behavior data in the buffer to the server,
wherein the history information comprises the number of transmissions, a transmission frequency of the host application, and whether the previous transmission of the host application is successful.

7. The data transmission device according to claim 1, wherein the processor is further configured to store the behavior data received by the SDK program of the host application in a buffer, wherein before the SDK program of the host application transmits the behavior data to the server, the host application determines whether a file size of the behavior data of the buffer is greater than a preset threshold;
when determining that the file size is less than the preset threshold, the SDK program of the host application does not transmit the behavior data to the server; and
when determining that the file size is greater than or equal to the preset threshold, the SDK program of the host application transmits the behavior data to the server.

8. A data transmission method applicable to a data transmission device, wherein the data transmission device comprises a storage module storing a plurality of applications, a processor coupled to the storage module and a communication interface coupled to the processor, the method comprising:
determining, by the processor, a host application among the plurality of applications, wherein the host application comprises an SDK program;
requesting, by the SDK program of the host application, behavior data from the plurality of applications, wherein the plurality of applications share data with each other; and
transmitting, by the host application, the behavior data to a server through the communication interface.

9. The data transmission method according to claim 8, wherein each application comprises a tag, and the host application obtains the behavior data of the plurality of applications having the same tag.

10. The data transmission method according to claim 8, further comprising
determining the host application among the plurality of applications according to a time interval;
requesting the behavior data from other applications by the SDK program of the host application; and
recording, after transmitting the behavior data to the server, history information, wherein the history information comprises the host application for transmitting the behavior data, time information, and the number of transmissions.

11. The data transmission method according to claim 10, wherein after the SDK program of the host application transmits the behavior data to the server, the method further comprises
broadcasting, by the SDK program of the host application, a completion signal to the plurality of applications by the SDK program of the host application;
deleting, by the plurality of applications, the behavior data that has been transmitted to the host application according to the completion signal; and
setting, by each of the SDK programs of the plurality of applications, a timer to start counting down.

12. The data transmission method according to claim 11, further comprising
setting the application that has completed the timer as the host application;
sending, by the SDK program of the host application, a termination instruction to other applications;
stopping, by the SDK programs of the plurality of applications, their own timers according to the termination instruction; and
request the behavior data from other applications by the SDK program of the host application.

13. The data transmission method according to claim 11, wherein the method further comprises
requesting, after the countdown is completed, the behavior data from the plurality of applications, store the behavior data in a buffer, and update the history information by the SDK program of the host application; and
determining whether to upload the behavior data according to the history information,
wherein when determining to upload the behavior data, the SDK program of the host application is executed to transmit the behavior data in the buffer to the server,
wherein the history information comprises the number of transmissions, a transmission frequency of the host application, and whether the previous transmission of the host application is successful.

14. The data transmission method according to claim 8, wherein the method further comprises
storing the behavior data received by the SDK program of the host application in a buffer, wherein before the SDK program of the host application transmits the behavior data to the server, the host application determines whether a file size of the behavior data of the buffer is greater than a preset threshold;
when determining that the file size is less than the preset threshold, the SDK program of the host application does not transmit the behavior data to the server; and determining that the file size is greater than or equal to the preset threshold, the SDK program of the host application transmits the behavior data to the server.

15. A non-transitory computer readable recording medium storing a plurality of program codes, wherein after the program codes are loaded into a processor, the processor executes the program codes to complete the following steps:

determining a host application among plurality of applications, wherein the host application comprises an SDK program;

requesting behavior data from the plurality of applications by the SDK program of the host application, wherein the plurality of applications share data with each other; and transmitting, by the host application, the behavior data to a server.

* * * * *